United States Patent [19]
Sandelman

[11] Patent Number: 6,026,651
[45] Date of Patent: Feb. 22, 2000

[54] REMOTE CONTROLLED DEFROST SEQUENCER

[75] Inventor: David Sandelman, Chatham, N.J.

[73] Assignee: Heat Timer Corporation, Fairfiled, N.J.

[21] Appl. No.: 09/120,294

[22] Filed: Jul. 21, 1998

[51] Int. Cl.$^7$ .................................................. F25B 47/02
[52] U.S. Cl. .............................. 62/155; 236/51; 307/35; 307/39
[58] Field of Search ........................ 62/151, 152, 155, 62/234, 230; 236/51; 307/35, 38, 39

[56] References Cited

U.S. PATENT DOCUMENTS

| | | | |
|---|---|---|---|
| 3,862,430 | 1/1975 | Lenhart et al. | 307/35 |
| 4,125,782 | 11/1978 | Pollnow, Jr. | 307/35 |
| 4,151,723 | 5/1979 | Gardner | 62/155 X |
| 4,168,491 | 9/1979 | Phillips et al. | 340/310 A |
| 4,362,270 | 12/1982 | Cleary et al. | 236/51 X |
| 4,682,648 | 7/1987 | Fried | 236/51 X |
| 5,095,715 | 3/1992 | Dudley | 62/230 X |
| 5,237,830 | 8/1993 | Grant | 62/155 |
| 5,363,669 | 11/1994 | Janke et al. | 62/155 |
| 5,369,962 | 12/1994 | Szynal et al. | 62/298 |
| 5,373,705 | 12/1994 | Janke et al. | 62/151 |
| 5,379,608 | 1/1995 | Ishimaru et al. | 62/155 |
| 5,415,005 | 5/1995 | Sterber et al. | 62/154 |
| 5,456,087 | 10/1995 | Szynal et al. | 62/154 |
| 5,469,715 | 11/1995 | Janke et al. | 62/155 |
| 5,515,692 | 5/1996 | Sterber et al. | 62/154 |
| 5,533,360 | 7/1996 | Szynal et al. | 62/298 |
| 5,564,286 | 10/1996 | Suse | 62/153 |
| 5,576,700 | 11/1996 | Davis et al. | 340/825.16 |
| 5,581,801 | 12/1996 | Spriester et al. | 455/3.3 |
| 5,687,139 | 11/1997 | Budney | 368/10 |
| 5,748,104 | 5/1998 | Argyroudis et al. | 340/870.11 |

*Primary Examiner*—Harry B. Tanner
*Attorney, Agent, or Firm*—Levisohn, Lerner, Berger and Langsam

[57] ABSTRACT

A remote controlled system for remotely controlling a high load device, such as the defrosting cycle of a self-defrosting refrigerator, is provided. The system includes a data interface to receive commands from an electricity supplier and to transmit those commands via the power line to the refrigerator. The refrigerator is equipped with a power line interface to receive the commands from the power line and transmit the commands to a defrost sequencer. Between the power line interface and the defrost sequencer may be provided another interface that converts the commands into a digital signal more suitable for the defrost sequencer, which is typically a microprocessor.

19 Claims, 2 Drawing Sheets

REMOTE CONTROLLED DEFROST SEQUENCER

BACKGROUND OF THE INVENTION

1. Field of the Invention

This invention relates to systems for manipulating electrical loads, and more particularly to systems for defrosting refrigerators.

2. Description of Related Art

Conventional refrigeration systems require defrosting, that is, a removal of layers of ice or frost which build up on the interior of a cooled compartment. Defrosting refrigeration systems requires large amounts of energy. It would be desirable for a supplier of electricity to have the ability to control precisely when a customer's refrigeration system is defrosted; it is preferable for defrosting to occur during low demand periods, so as to reduce the likelihood of a brownout, for example.

Conventional refrigeration systems utilize a simple timing mechanism to regulate when the defrost cycle is to occur, usually triggering the defrost cycle merely at regular intervals. The drawback to such a system is that the time of day is not considered when the defrost cycle is triggered. As such, the defrost cycle may be commenced during high demand periods, to the inconvenience and detriment of the electricity supplier.

Some devices have been employed to reduce the amount of energy used during defrosting, which somewhat reduces the load that the defrosting refrigerator places on the electricity supplier. Other simple timing devices have been employed to start the defrost cycle at a specific time of day. These devices are limited, however, in that atypical spikes in electricity demand create unpredictable high demand periods for which a simple timing device cannot account.

Moreover, the predetermined time at which the defrost cycle is triggered is typically set either by the end user or by a microprocessor in the end user's refrigerator, and not by the electricity supplier. The average end user or such microprocessor is unaware of or indifferent to the load patterns of the electricity supplier; thus it is doubtful that an end user can make a useful determination as to what time of day his refrigeration system should be defrosted. Further, in these types of conventional devices, the electricity supplier is offered no control over the defrosting cycles of its end users.

Some of these prior art devices are described in U.S. Pat. Nos. 5,533,360 and 5,369,962 to Szynal et al., the teachings of which are incorporated herein by reference. Szynal et al. teach three common ways for an internal defrost cycle controller to monitor the refrigerator in which it is disposed: real time, cumulative time, and variable time methods. One embodiment of the Szynal et al. device includes a defrost cycle controller having a circuit with a plug-in module that can be used either as a variable time controller, a real time controller, or a cumulative run controller. In operation, a microprocessor senses signals which inform the microprocessor about the actual running of the compressor and the defrost heater. The microprocessor can determine the cumulative and continuous run times of the compressor and defrost heater and can thereby determine how to alter the operation of either or both to obtain increased efficiency.

The Szynal et al. devices suffer from the same drawbacks as those listed above. That is, they may be suitable to reducing the total amount of energy that a refrigerator might use, however they do not take into account high peak periods, nor do they allow for input from the electricity supplier regarding when the defrost cycle should and should not be activated.

U.S. Pat. No. 5,415,005 to Sterber et al. (which is herein incorporated by reference) purports to provide a device for initiating a defrost cycle during an off-peak demand period. Sterber et al. teach a control device whereby the initiation of the defrost cycle is responsive to the daily power consumption of the refrigerator. It includes a microprocessor which is programmed to determine the time of day without the usage of a clock by analyzing the energy consumption of the refrigerator during a 24-hour period. By determining the approximate time of day, the Sterber et al. control device is able to initiate a defrost cycle during what it believes to be an off-peak demand period.

The Sterber et al. device also suffers from the above-mentioned drawbacks of the prior art. Specifically, the Sterber et al. device does not actually allow the electricity supplier itself to have any input as to when the refrigerator defrost cycle should occur; instead, the microprocessor "guesses" as to what is an off-peak demand period based on the usage of the refrigerator. The microprocessor could easily be misled if it merely relies upon the one refrigerator's data. For example, in a household where all of the inhabitants go to work or to school, the refrigerator is typically fairly inactive between the hours of 9:00 am and 4:00 pm. The Sterber et al. control device might believe, because of this inactivity, that the ideal time to defrost the refrigerator is 1:00 pm. However, 1:00 pm is a point in the typical day when most businesses are operating at peak load; as a result, although the domestic refrigerator might not be at its most active, the time chosen represents a high-demand period from the electrical supplier's point of view.

SUMMARY OF THE INVENTION

Accordingly, it is an object of the invention to provide a system which enables a supplier of electricity to control the precise time when a high load electrical device is activated.

It is another object of the invention to provide a system which enables a supplier of electricity to control the precise time when the defrost cycle of a refrigeration system is activated.

It is another object of the invention to provide a system which enables a supplier of electricity to activate an end user's high load electrical device during low demand periods.

It is another object of the invention to provide a system which enables a supplier of electricity to activate the defrost cycle of an end user's refrigeration system during low demand periods.

The above and other objects are fulfilled by the invention, which is a sequencing system for remotely controlling a power cycle of a high-load electrical device, such as a defrosting cycle of a self-defrosting refrigerator. The refrigerator is electrically connected to a power line and has a defrost sequencer. The system includes a data interface having an input adapted to receive commands and an output connected to the power line; the data interface is adapted to transmit the commands via the power line. A power line interface is also provided. The power line interface has an input and an output and is designed to receive the commands from the power line and convert the commands into a digital signal based on the commands. The input of the power line interface is electrically connected to the power line for receiving the commands from the power line, and the output of the power line interface is for transmitting the digital signal. The power line interface transmits the digital signal to the defrost sequencer to control the defrosting cycle of the refrigerator based on the digital signal.

Preferably, the commands, in the form of the digital signal, instruct the defrost sequencer regarding either the start time of the defrosting cycle, the duration of the defrosting cycle, or both. Other variables and parameters relevant to the defrosting cycle, such as energy load and boundary temperatures, are also controllable in the same manner. Other commands may preferably include an "initiate defrost sequence" command, a "delay defrost sequence" command, and/or a "stop defrost sequence" command.

The invention also includes a method of remotely controlling a defrosting cycle in a refrigerator. In the inventive method, commands are provided to a data interface having an input adapted to receive commands and an output connected to the power line; the data interface is adapted to transmit the commands via the power line. The commands are converted into a digital signal based on the commands. The digital signal is then transmitted to a defrost sequencer connected to the defrost sequencer interface output for receiving the digital signal from the defrost sequencer interface and controlling the defrosting cycle of the refrigerator based on the digital signal received from the defrost sequencer interface.

The purpose of the invention is to allow suppliers of electricity the ability to better manage when electricity is to be consumed by refrigeration systems for the purposes of defrosting. The invention gives direct control of the defrost cycle (or any other high load appliance or appliance performance mode) to the supplier of electricity to effect the defrost cycle remotely.

DETAILED DESCRIPTION OF THE PREFERRED EMBODIMENTS

Description of the invention will now be given with reference to FIGS. 1 and 2.

Figure 1:
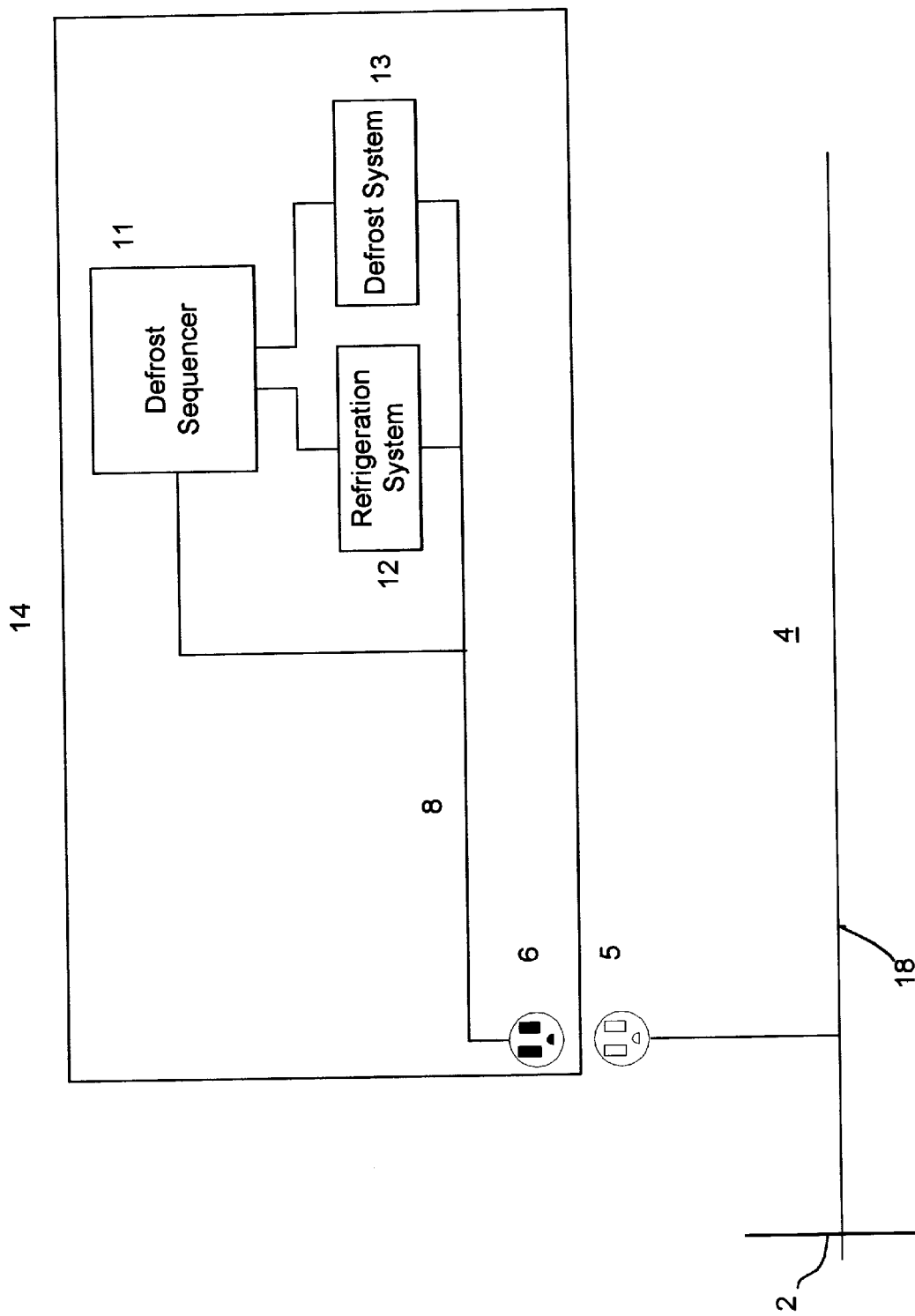
FIG. 1 is a block diagram of a conventional frost-free refrigerator.
Figure 2:
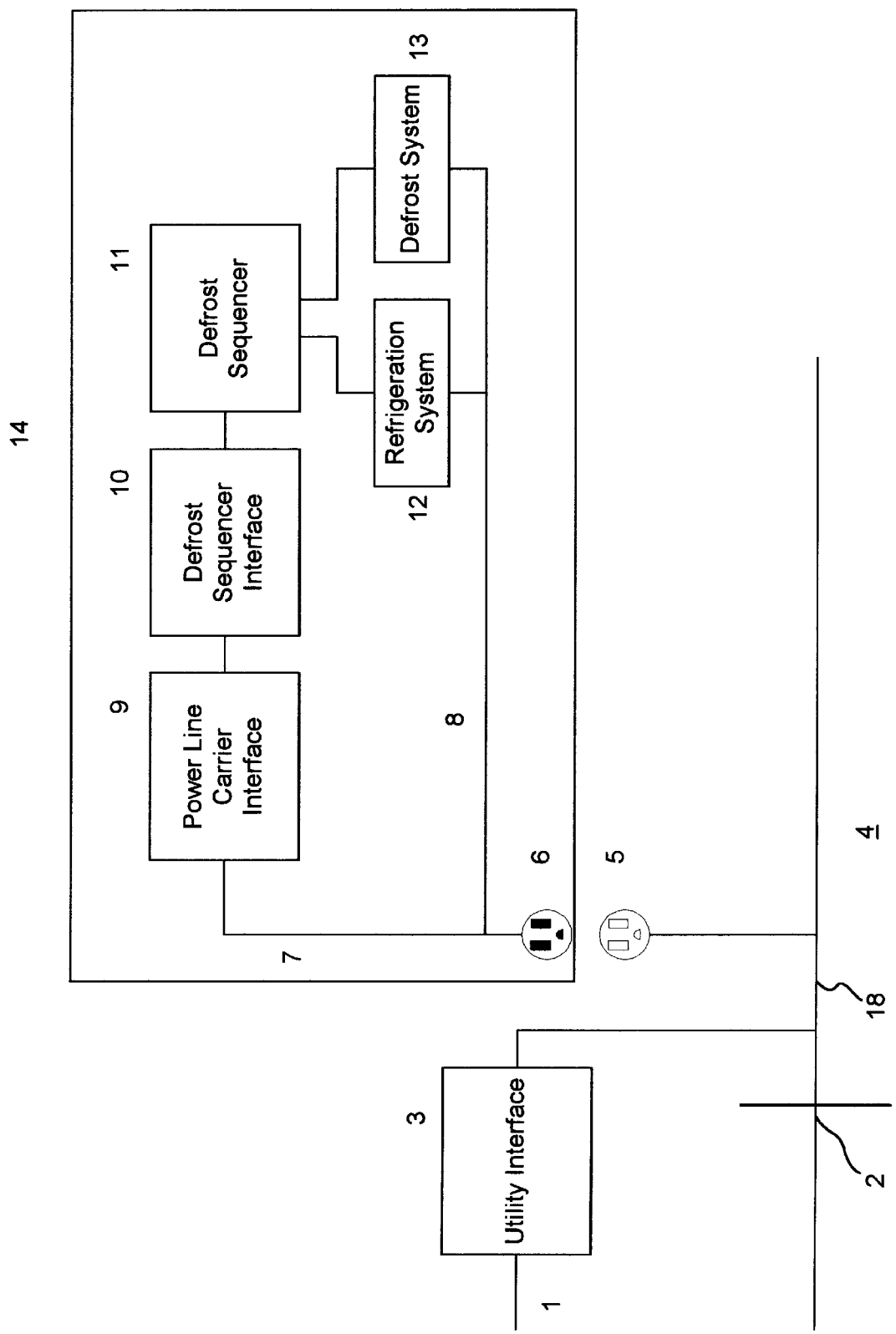
FIG. 2 is a block diagram of a remote controlled sequencing system according to the present invention.

FIG. 1 shows the major components of a typical frost-free refrigerator. Power is supplied to a building at point 2 and distributed throughout the building by the electrical wiring contained in the building 4. Refrigerator 14 is placed in close proximity to outlet 5 and is connected thereto by plug 6. Power is distributed to the various components of the refrigerator by its internal wiring 8. Defrost sequencer 11 controls refrigeration system 12 and defrost system 13. Many different types of defrost sequencers exist in the art, for example, those referenced above.

The present invention can alter the time when the defrost cycle occurs and/or other parameters of the defrost cycle, such as duration, temperature, etc. An embodiment of the present invention is depicted in FIG. 2. A utility interface 3 may preferably be mounted outside the building at a point where utility services are located. Utility interface 3 receives commands from the electricity supplier via a network connection 1. Network connection 1 may be of any type of conventional data transmission system, e.g., the local telephone line, the cable television line, an automated meter reading system, or the like. Utility interface 3 will convert the commands received from the electricity supplier and retransmit them onto the power lines 18 of building 4. Techniques of transmitting data or signals over power lines is known.

The signal data will be received by power line carrier interface 9 via line 7 and formatted for defrost sequencer interface 10. Defrost sequencer interface 10 then alters the operation of defrost sequencer 11, typically a microprocessor, according to the commands sent via network connection 1. Interface 10 represents an interface circuit that bridges the 110 V power line carrier circuit to the low voltage microprocessor of sequencer 11. In some instances, depending upon the type of power line carrier interface used, a single component may be used to receive the signal data from power line 18 instead of the use of a power line carrier interface and a defrost sequencer interface.

Some of the power line carrier systems available in the market are CEBus, X-10, and LonWorks. X-10 is currently sold as a remote light switch/home automation system and would work in this application with limited reliability. CEBus is a standard that is emerging as a forerunner in consumer product interface protocols. Several companies produce chips that would be suitable as power line carrier interface 9. One manufacturer of the CEBus interface is Intellon; specific products include part numbers P111, P200, P300, and P400. LonWorks also sells a power line carrier interface, part number PLT-10.

The role of defrost sequencer interface 10 can be filled by a standard micro-controller. Two such available micro-controllers are the Motorola 68HCxxx and the Micro-Chip PIC.

The utility interface is available in several forms. One such device is described in U.S. Pat. No. 5,699,276 to Roos, the teachings of which are herein incorporated by reference.

In operation, the invention works as follows. An electricity supplier desires to reduce the load on the grid during a peak demand time of day. If the data interface is a two-way interface and allows for the bi-directional transfer of information (i.e., information is transmitted both to and from the electricity customers), then the supplier may notice that there are domestic refrigeration units going into their respective defrost cycles during such peak demand times. In the alternative, information flow may be unidirectional (i.e., only from the supplier to the customer). In this case, while the supplier may not know when a domestic refrigeration unit is defrosting, the supplier will know that it does not want any units defrosting during a peak period.

In either case, the supplier issues a command over a network which is transmitted to utility interface 3 via network connection 1. Utility interface 3 converts the commands and re-transmits them over power line 18 into building 4. The commands travel along the wiring of the building and reaches refrigerator 14. Via line 7, a power carrier interface 9 receives the commands and reformats them for the defrost sequencer interface 10 which, in turn, instructs the defrost sequencer 11 to hold off on activating the defrost cycle until a certain off-peak time (e.g., 3:00 am). For low-cost domestic units that do not possess a real-time clock, the commands may include a "delay defrost sequence" command instructing the unit to hold off activating the defrost cycle for a certain amount of time (e.g., 20 minutes). If a cycle is already in progress, the system may send a "stop defrost sequence" command. Again, if the system is a one-way system allowing only for information to be transmitted to the domestic unit, the supplier could send out both the "delay" command and the "stop" command at the same time, effectively instructing the refrigerator "if you have not started defrosting, do not start for another x minutes; otherwise, stop right now." Conversely, the supplier may have a surplus of power and may wish to instruct domestic units to defrost now or at a certain time, by way of an "initiate defrost sequence" command in order to reduce the surplus.

The invention can be used not just to set the activation time of the defrost cycle but can also be used to alter other parameters of the cycle. For example, a defrost sequencer may have an upper boundary temperature parameter below which the food compartment must be in order for the defrost cycle to be activated; i.e., if the food compartment temperature is too high, the defrost cycle will not occur. A supplier of electricity can utilize the present invention to adjust this parameter depending upon local weather conditions. A similar adjustment may be made for a lower boundary temperature parameter, i.e., if the food compartment temperature is above a certain minimum, the defrost cycle may be enabled. Similar parameters may take into account the relative humidity as well.

The invention is not limited to the above description but rather is defined by the claims appearing hereinbelow. Modifications to the above description within the ordinary skill in the art are well within the scope of the contemplated invention. For example, while an electrical supplier can send specific commands to a specific device, it is also contemplated that a general command can be "broadcast" over the network to which network connection 1 is connected. Embedded in the command may be a device identifier code or marker which will only be applicable to certain devices or certain types of devices. For example, if a supplier desired to affect only domestic refrigerators, a command would be sent with a certain device identifier marker. If a device receiving that command matches up with the marker code, the device will follow the instructions; otherwise, a different device would simply ignore the command. Moreover, the invention is not limited to a remote refrigeration defrost sequencer. The invention also includes a sequencing system for remotely controlling the activity of any high load electrical device.

What is claimed is:

1. A remote system for enabling an electricity supplier to remotely control a defrosting cycle of a plurality of self-defrosting refrigerators of electricity customers to thereby control power demand the refrigerators being electrically connected to at least one power line and each having a defrost sequencer, comprising:

a data interface having an input adapted to receive commands from the electricity supplier and an output connected to the power line adapted to transmit said commands via the power line;

a power line interface, having an input and an output, for receiving said commands from the power line and converting said commands into a digital signal based on said commands, said power line interface input electrically connected to the power line for receiving said commands from the electricity supplier via the power line, and said power line interface output for transmitting said digital signal, wherein said power line interface transmits said digital signal to the defrost sequencer to control the defrosting cycle of the refrigerator based on said digital signal to enable the electricity supplier to control when the defrosting cycle is performed so as to reduce power load during at least peak demand periods.

2. A sequencing system according to claim 1, wherein said commands set at least one parameter of the defrost sequencer including at least one of a start time, a duration of the defrosting cycle, an energy load of the defrosting cycle, and a boundary temperature parameter of the defrosting cycle.

3. A sequencing system according to claim 1, wherein said data interface is disposed external to the refrigerator.

4. A sequencing system according to claim 1, wherein said power line interface is disposed internal to the refrigerator.

5. A sequencing system according to claim 1, wherein said data interface is disposed external to the refrigerator.

6. A sequencing system according to claim 1, wherein said power line interface is disposed internal to the refrigerator.

7. A sequencing system according to claim 1, wherein said commands include at least one of:

a) an initiate defrost sequence command;

b) a delay defrost sequence command; and c) a stop defrost sequence command.

8. A remote sequencing system for enabling an electricity supplier to remotely control a defrosting cycle of a plurality of self-defrosting refrigerators of electricity customers to thereby control power demand, the refrigerators being electrically connected to at least one power line and having a defrost sequencer, comprising:

a data interface having an input adapted to receive commands from the electricity supplier and an output connected to the power line adapted to transmit said commands via the power line;

a power line interface having an input and an output, said power line interface input electrically connected to the power line for receiving said commands from the electricity supplier via the power line, and said power line interface output for transmitting said commands; and a defrost sequencer interface connected to said power line interface output for receiving said commands from said power line interface output and converting said commands into a digital signal based on said commands, wherein said defrost sequencer interface transmits said digital signal to the defrost sequencer to control the defrosting cycle of the refrigerator based on said digital signal to enable the electricity supplier to control when the defrosting cycle is performed so as to reduce power load during at least peak demand periods.

9. A sequencing system according to claim 8, wherein said commands set at least one parameter of the defrost sequencer including at least one of a start time, a duration of the defrosting cycle, an energy load of the defrosting cycle, and a boundary temperature parameter of the defrosting cycle.

10. A sequencing system according to claim 8, wherein said commands include at least one of:

a) an initiate defrost sequence command;

b) a delay defrost sequence command; and c) a stop defrost sequence command.

11. A remote sequencing system for enabling an electricity supplier to remotely control a defrosting cycle of a plurality of self-defrosting refrigerators of electricity customers to thereby control power demand, comprising:

at least one power line for supplying electricity to said refrigerator from the electricity supplier;

a data interface having an input adapted to receive commands from the electricity supplier and an output connected to said power line adapted to transmit said commands via said power line;

a power line interface having an input and an output, said power line interface input electrically connected to said power line for receiving said commands from the electricity supplier via said power line, and said power line interface output for transmitting said commands;

a defrost sequencer interface connected to said power line interface output for receiving said commands from said power line interface output and converting said commands into a digital signal based on said commands; and a defrost sequencer connected to said defrost sequencer interface output for receiving said digital signal from said defrost sequencer interface and controlling the defrost cycle of the refrigerator based on said digital signal received from said defrost sequencer interface to enable the electricity supplier to control when the defrosting cycle is performed so as to reduce power load during at least peak demand periods.

12. A sequencing system according to claim 11, wherein said commands set at least one parameter of the defrost sequencer including at least one of a start time, a duration of the defrosting cycle, an energy load of the defrosting cycle, and a boundary temperature parameter of the defrosting cycle.

13. A sequencing system according to claim 12, wherein said data interface is disposed external to the refrigerator.

14. A sequencing system according to claim 12, wherein said power line interface is disposed internal to the refrigerator.

15. A sequencing system according to claim 12, wherein said defrosting sequencer comprises a microprocessor and said defrost sequencer interface comprises a bridging circuit.

16. A sequencing system according to claim 11, wherein said commands include at least one of:

a) an initiate defrost sequence command;

b) a delay defrost sequence command; and c) a stop defrost sequence command.

17. A method for enabling an electricity supplier to remotely control a defrosting cycle of self-defrosting refrigerators of electricity customers for thereby controlling power demand, comprising the steps of:

providing commands from an electricity supplier to a data interface having an input adapted to receive commands and an output connected to the power line adapted to transmit the commands from the electricity supplier via the power line;

converting the commands into a digital signal based on the commands;

transmitting the digital signal to a defrost sequencer connected to said defrost sequencer interface output for receiving said digital signal from said defrost sequencer interface and controlling the defrosting cycle of the refrigerator based on said digital signal received from said defrost sequencer interface, thereby enabling the electricity supplier to control when the defrosting cycle is performed so as to reduce power load during at least peak demand periods.

18. A method according to claim 17, wherein said commands execute a further step of setting at least one parameter of the defrost sequencer including at least one of a start time, a duration of the defrosting cycle, an energy load of the defrosting cycle, and a boundary temperature parameter of the defrosting cycle.

19. A method according to claim 17, wherein said commands include at least one of:

a) an initiate defrost sequence command;

b) a delay defrost sequence command; and c) a stop defrost sequence command.

* * * * *